United States Patent
Gross

[11] 3,885,855
[45] May 27, 1975

[54] FILTERING ANTISOLAR AND HEAT INSULATING GLASS

[75] Inventor: Daniel M. Gross, Carouge, Geneva, Switzerland

[73] Assignee: Battelle Memorial Institute, Switzerland

[22] Filed: Aug. 10, 1972

[21] Appl. No.: 279,472

[30] Foreign Application Priority Data
Aug. 16, 1971  Switzerland.................. 11990/71

[52] U.S. Cl. ............... 350/1; 117/33.3; 350/166
[51] Int. Cl. ......................................... G02b 5/20
[58] Field of Search .............. 350/1, 164, 165, 166; 252/300; 117/33.3

[56] References Cited
UNITED STATES PATENTS

| | | | |
|---|---|---|---|
| 2,564,677 | 8/1951 | Davis | 350/1 UX |
| 2,758,510 | 8/1956 | Auwärter | 350/166 |
| 2,784,639 | 3/1957 | Keenan et al. | 350/164 |
| 2,986,527 | 5/1961 | Redfield et al. | 350/1 |
| 3,514,175 | 5/1970 | Jenkins | 350/1 |
| 3,531,313 | 9/1970 | Dates | 350/1 |
| 3,591,248 | 7/1971 | Meunier et al. | 350/1 |
| 3,619,235 | 11/1971 | Furuuchi et al. | 350/1 |
| 3,649,311 | 3/1972 | Araujo | 350/1 |

OTHER PUBLICATIONS
Skinner et al., Titanium And Its Compounds, Herrick L. Johnston Enterprises, Columbus, Ohio, 1954, p. 61.

Primary Examiner—Ronald L. Wibert
Assistant Examiner—Matthew W. Koren
Attorney, Agent, or Firm—Robert E. Burns; Emmanuel J. Lobato; Bruce L. Adams

[57] ABSTRACT

A filtering antisolar and heat insulating glass formed of a support material capable of transmitting at least a part of the visible light and a coating of filtering material on at least one side of the support material, said filtering material comprising a compound of an element of the groups IVa, Va and VIa of the Periodic Table of elements and one of the metalloids boron, carbon, nitrogen and oxygen, said compound being in a state in which its peripheral electrons are displaced as in the metal state and having at least partly covalent bonds, said coating of filtering material being continuous or coalescent.

37 Claims, 5 Drawing Figures

FILTERING ANTISOLAR AND HEAT INSULATING GLASS

This invention relates to a filtering antisolar and heat insulating glass, comprising a support consisting of at least one panel made of a material which transmits at least a part of the visible light, and at least one layer of filtering material coating at least one of the faces of said panel, and comprising at least one compound including at least one element from the groups IVa, Va and VIa of the Periodic Table of the elements and at least one of the following metalloids: boron, carbon, nitrogen and oxygen.

Such glass is intended particularly for the protection of a closed space, such as, for instance, a dwelling room, an office, a storehouse and so on, or the passenger compartment of a vehicle, against the heating effect of the solar radiation incident onto the glass. This glass is also intended for use as a protection against the heating effect of radiation having a spectrum composed mostly of wavelengths belonging to the infrared domain, especially between about 7 and 35 microns (thermic infrared), for instance the radiation emitted by a high temperature source such as for instance a smelting furnace. Generally, this glass is intended to constitute a heat insulating element acting in opposition to the heat transmission through radiation between the inside and the outside of a closed space in order to prevent heating as well as cooling of said closed space.

The glass according to the present invention is also intended to have a high degree of transparency in respect of the visible light so as to allow good visibility and good illumination of the interior of the closed space, ensuring at the same time, as efficiently as possible, the above mentioned antisolar and heat insulating function.

Filtering antisolar glasses comprising a panel of glass or of another material transparent to visible light, at least one of the faces of which is coated with a partially transparent layer of a metal, such as gold, copper and the like, having a thickness of some hundred Angstrom, are already known. These glasses, although being very efficient as far as filtering of infrared radiation is concerned, present certain disadvantages. In fact, the metal layer or layers have a very low abrasion resistance. In order to prevent this disadvantage it has been proposed to cover the free surface of the metal layers by means of an additional glass panel. However, a compound glass thus obtained possesses antisolar properties which are inferior to those of a simple glass in which the face turned towards the inside of the room is coated by means of a metal layer. In fact, the emissivity of the glass for thermic infrared radiation is higher than that of a metal and a great part of the solar energy which is absorbed in form of heat by the glass is transmitted, through radiation in the domain of the wavelengths corresponding to the thermic infrared, towards the interior of the room. There results a considerable loss of efficiency in the protective function of the compounded glass against the solar radiation. In order to avoid this latter disadvantage and, more generally, increase the heat insulating and sound-proofing power of such glasses, they have been constructed in the form of a double glass comprising two glass panels parallel to each other and spaced by means of a gap enclosing generally dry air or any other suitable gas, one of these panels being coated with a semitransparent metal layer on its face turned towards said gap. The glasses according to this latter construction possess a very good heat insulating power and a high protective efficiency against the heating of the room due to radiation, but they present the disadvantage of being heavy and expensive and not lending themselves to being cut. The various known forms of glasses provided with a filtering metal layer have in common the disadvantage of having a strong reflexion in the domain of visible light. Furthermore, the intensity of this reflexion varies strongly with the wavelength. The result is on one hand a great risk of glare for the observers placed outside the room and on the other hand a strong coloring in reflexion, which may be undesirable in certain cases, for instance for architectural reasons.

Other filtering antisolar glasses are known, comprising at least one panel of glass or another material transparent for the visible light, containing incorporated therein colored metal ions, for instance ferric ions or ions of at least one of the following metals: V, Cr, Mn, Ni, Co, Cu, and the like. These glasses do not present the above mentioned disadvantages of being particularly subject to abrasion and to undesirable reflexions; however, they are greatly impaired by the loss of protective efficiency against heating caused by solar radiation, because their filtering action is due to the absorption of the radiation more than to their reflexion, which absorption is accompanied by a strong heating action in the mass of these glasses. Furthermore, the intensity of the visible light transmitted by these glasses varies greatly according to the variation of the wavelength, thus producing an alteration of the colors. Finally, these glasses are subject to considerable internal tensions by temperature differences, in consequence of local intensity differences of a radiation irradiating their surface or in consequence of rapid variations of this radiation as a function of time, which tensions may be sufficiently strong to produce breaking of the glass.

On the other hand, glasses are known which comprise a glass panel coated at least on one of its faces by means of a film composed essentially of nitride, carbide or silicide of at least one element selected from the groups IV, V and VI of the periodic table of elements, these compounds being employed either separately or in form of combinations of more than one of these compounds. Such glasses present the particular advantage of having a physical resistance and a chemical inertia superior to those of the glasses provided with metal films. However, these glasses afford only a partial solution of the problem inherent in the sunbeam filtering, the terms of which have been indicated above. In fact, in the domain of wavelengths between 0.4 and 3 micron, the value of the spectral transmission of said glasses increases generally with the wavelength. As a result the transmission of these glasses is higher in the domain of the infrared than in the visible part of the spectrum, which is evidently in contrast with the purpose of the present invention, i.e. a transmission as weak as possible in the infrared domain associated with a high transparency in respect of visible light.

One object of the present invention is to prevent above mentioned inconveniences and, particularly, provide a glass having a great protective efficiency against heating and glare produced by solar radiation and against heating caused by radiation having a spectrum composed for a great part of wavelengths belonging to the thermic infrared domain, and having, in a general way, a high insulating power, by withstanding the heat transfer, due to radiation, between the inside and the outside of a closed space. Another object of the invention is to provide a filtering antisolar and heat insulating glass having a neutral colour both in reflexion and in transmission.

Still another object of the invention is to provide a glass having the above mentioned advantages and yet comprising a single panel.

A further object of the present invention is to provide a glass having high mechanical resistance and chemical inertness in combination with optimal properties of radiation transfer, that is to say, having a high and approximately constant transmission in the visible part of the spectrum and a weak transmission in the ultraviolet and in the infrared, the low value of the transmission in the infrared being obtained with a decided prevalence of the reflexion over the absorption, and a low emissivity in the thermic infrared range which is the part of the spectrum corresponding to the wavelengths between 7 and 35 micron).

To this end, the glass according to the present invention is characterized in that said compound is in a state in which it presents simultaneously a dislocalization of its peripheral electrons, which is characteristic of the metallic state, and at least partially covalent bonds, and that the layer of filtering material is continuous or coalescent.

Surprisingly, the beneficial effects of the invention are obtained even when utilizing some of the compounds, namely nitrides or carbides, which have been utilized less successfully for the above mentioned known glasses. The reasons of this state of things will be better understood through the following explanations relative to the function exerted by the simultaneous presence of a dislocalization of the peripheral electrons, similar to that of a metal, and of at least partially covalent bonds in the compound utilized as "active compound" in the glass according to the present invention, and by the fact that the layer of this filtering material is continuous or coalescent. In order that the transmission of the filtering material layer may have an approximately constant value, for instance nearly 35 percent in the visible domain of the electromagnetic radiation spectrum (i.e. for the wavelengths between 0.4 and 0.7 micron), the above defined active compound must have a fundamental absorption threshold $\Delta E_p$ situated in the ultraviolet range and consequently corresponding to a wavelength less than 0.4 micron. As expressed in terms of energy, this condition means that $\Delta E_p$ must be higher than 3 electron-volts.

Only the compounds having at least partially covalent bonds, i.e. either completely covalent or partially covalent and partially ionic, are in a position to correspond to this condition. The known compounds of this type are either insulating or conductive compounds, among which the borides, nitrides, sub-oxides and carbides of the elements belonging to the groups IV$a$, V$a$ and VI$a$ of the periodic system of elements. Other conductive compounds of this type are known, particularly the silicides, phosphides, sulphides, germanides of the latter elements, but these compounds are less stable than the borides, nitrides, sub-oxides and carbides and consequently they are non applicable in the glass according to the present invention. The insulating compounds, in turn, are to be excluded because of their excessively weak reflexion in the infrared range. In order that the filtering material layer may have a high reflexion in the domain of the near infrared and, more precisely, for the wavelengths between, for instance, 0.7 and 2.5 micron, it is necessary that the free electron density of the active compound be in the order of $10^{22}/cm^3$, which corresponds to an electronic dislocalization which is characteristic of the metallic state.

If this condition is met and if, at the same time, the filtering material layer is continuous or at least coalescent, said layer will have, with a small thickness for instance between about 200 and 1,000 A, a high reflexion and a low value of its absorption and its transmission for the above mentioned wavelength domain, i.e. for the domain between about 0.7 and 2.5 micron.

Practically, the double condition with respect to the electronic dislocalization of the active compound and to the fact of the filtering material layer being continuous or coalescent, is suitably fulfilled when the resistance of said layer, as measured for a surface element of square form and for a thickness between 200 and 1,000 A, is equal at most to 200 ohms at ambient temperature and no more than 400 ohms at the temperature of liquid air, i.e. 78°K (− 195°C).

In the visible part of the spectrum, a continuous or coalescent layer of active compound corresponding to the above specified conditions has a low reflexion taking a minimum value of, for instance, 20 percent for a wavelength of 0.5 micron, and its absorption A, which is related to a reflexion R and a transmission T by the relation $$A = 1 - R - T,$$

is, for instance, in the order of 45 percent for a transmission having the value of 35 percent which has been mentioned above by way of example.

It should be noted that such a layer presents the additional advantage of having a very low average coefficient of thermic emissivity, which contributes in conferring heat insulating properties to the glass according to the present invention. In fact, only a small part of the colorific energy accumulated in the glass by absorption can be emitted again by the glass face which is coated with the layer of filtering material. Therefore, if the glass is utilized for a window of a closed space to be proected against heating by sunbeam irradiation, it is sufficient to place the filtering material layer on the inside face of the glass to obtain a particularly good protection of said closed space.

This protective effect is obtained for the most part thanks to the fact that the emission coefficient of the filtering material layer in the thermic infrared is very low, whereas glass presents a thermic emission capacity which is near to that of a black body. The a fact that continuous or coalescent layer, made of a compound presenting a dislocation of its peripheral electrons similar to that of a metal, has a high reflexion in the thermic infrared, namely in the domain of wavelengths included between 7 and 35 micron, renders it possible to obtain a simple glass (i.e. a glass comprising only one panel) having heat insulating properties which are comparable to those of a double glass. Since, when a glass is placed in contact with a calm atmosphere, the heat exchanges between the glass and the atmosphere are effected preponderantly by radiation in the thermic infrared range and, to a smaller extent, by convection, it would be possible, in case of absence of strong atmospheric movements, (less than 1 m/sec) to utilize the glass according to this invention in its embodiment comprising a filtering material layer on only one face of the glass panel, by placing this layer outside the closed space. However, in most cases it is advantageous to place this layer inside the closed space. This allows suppression of most of the heat transfer through radiation between the windowpane and the walls of the room and the objects contained therein. Consequently, the utilization of the glass according to this invention allows to reduce, in summer time, the effect of heating and, in winter time, the effect of cooling of said walls and objects, as compared with a normal glass.

If the layer of filtering material is not continuous or coalescent, that is if this layer is composed of islets or separated granules of material (so-called "insular layer"), the way of varying of the reflexion and absorption of said layer, as a function of the wavelength, is completely different from that described in the foregoing. In fact, as it has already been described in the case of insular layers of metals such as gold or silver (for instance, in the following publications: W. HAMPE, Zeitschrift fuer Physik, 152, 470 (1958) and R. H. DOREMUS, Journal of Chemical Physics 42, 414 (1965)), such insular metal layers present a so-called "abnormal" absorption band in the visible or in the near infrared and have a low absorption and a strong transmission, which are almost independent frrom the wavelength, in the remaining part of the infrared domain. An insular layer of a compound corresponding to the definition given above, consequently, does not allow the obtaining of the ensemble of the optical properties, in the visible, near infrared and thermic infrared parts of the spectrum of electromagnetic radiations, which is, on the contrary, obtained by utilizing a continuous or coalescent layer of the same compound.

As compound of an element or elements belonging to the groups IVa, Va and VIa of the Periodic Table of elements and boron, carbon, nitrogen and oxygen, it is preferable to utilize a nitride, carbide, boride, suboxide or carbonitride of at least one of the following metals: titanium, zirconium, hafnium, vanadium, niobium, tantalium, chromium, molybdenum and tungsten.

As nitride, for instance, one of the following compounds may be utilized: TiN, ZrN, HfN, VN, NbN, TaN, CrN and $Cr_3N_4$.

As carbide, for instance, one of the following compounds may be utilized: ZrC, HfC, TaC and WC.

As boride, for instance, one of the following compounds may be utilized: $Zt_3B_4$, HfB, $VB_2$, $NbB_2$, $TaB_2$ and $TiB_2$.

As suboxide, for instance, one of the following compounds may be utilized: TiO, VO and NbO.

As carbonitride, for instance one of the following compounds may be utilized: $TiN_{0.7}C_{0.3}$ and $NbN_{0.4}C_{0.6}$. A mixture or a combination of at least two different compounds may also be utilized, which allows the spectrums of transmission and reflexion of the glass to vary at will as a function of the wavelength, particularly in the domain of visible light and more particularly in the red portion of said domain, as well as in the near infrared portion.

The filtering material layer may be formed by a compound corresponding to the above given definition or by a mixture or a combination of such compounds, in a compact continuous or at least coalescent (i.e. constituted of islets connected to each other) form and in the crystal state.

The filtering material layer may, however, be in the form of a continuous layer of a suspension or a dispersion of said compound or in the form of a mixture or combination of such compounds in a transparent-semiconductive substance.

This transparent semi-conductive substance may be constituted by a semiconductor having a high density of free electrons, particularly one of the following oxides: $SnO_2$, CdO, ZnO, SnO, $In_2O_3$, $Ga_2O_3$ or a mixed oxide comprising at least two of said oxides. In this case, a glass is obtained which has a high transparency in the visible part of the spectrum nd a strong reflexion in the domain of the thermic infrared radiations.

The thickness of the filtering material layer depends upon the selected filtering material and filtering degree as well as light transmission intensity which are desired. Preferably, this thickness is comprised between 200 and 1000 A. Both faces of the panel, or only one of them, may be coated by means of a layer of filtering material. Preferably, however, the panel face which is intended to be turned towards the interior of the room is coated by means of such a layer.

As material to form the panel may be utilized any suitable material having a sufficiently high stiffness and a sufficient transparency in respect of the visible light, compatible with the filtering material and fit for receiving, after having been made up in the form of a panel, a layer of filtering material with a high adhesion of this layer on the panel surface.

For the formation of the panel it is preferable to employ a mineral glass, particularly a borosilicate glass, such as a "hard glass," i.e. a glass enclosing chiefly silicon oxide and boron oxide.

The glass may have any form and any dimension suitable for its utilization.

To form the panel, any other suitable known material may also be utilized having by itself properties of radiant energy absorption, for example a glass enclosing lead oxide which presents a high absorption power of a strong energy radiation, particularly ultraviolet rays and X-rays, or also a glass dyed in the mass by means of incorporation of metal ions, for instance a glass enclosing 1 to 6 percent in weight of ferric ions and having a high absorption power for a radiation having a wavelength between 0.7 and 2 micron.

The glass may include, besides the support and the filtering material layer, a transparent layer of an additional filtering material transmitting at least a part of the visible light and absorbing at least a part of the radiation having a wavelength between 0.7 and 2 micron. Such a layer of additional filtering material may be composed of at least one metal oxide known for its properties of absorption of radiation having a wavelength comprised in the domain of the near infrared, particularly one of the following oxides: FeO, NiO and CoO.

The layer of additional filtering material may coat one panel face which is not coated by the filtering material layer comprising the compound in the metal state, this first layer being preferably placed on the side of the panel which is intended to be turned towards the inside of the room, or said additional filtering material layer may be interposed between the surface of the panel and the filtering material layer comprising the compound in the metal state. In the first case, preferably, the filtering material layer is coated by means of a protective transparent layer, for example a thin panel of glass.

Besides the support and the filtering material layer, the glass may also comprise a layer at least partially transparent in the visible part of the spectrum, constituted by a semiconductor having a high density of conduction electrons. Preferably, this layer is placed on one panel face which is not coated by means of the filtering material layer. A semiconductor, particularly one of the following oxides may be employed: $SnO_2$, CdO, ZnO, SnO, $In_2O_3$, $Ga_2O_3$ or a mixed oxide composed and started from at least two of said oxides. Such a semiconductor layer has a strong reflexion in the domain of the thermic infrared radiations, and its utilization in the glass according to this invention renders it possible to increase the heat insulating action of the glass.

The glass according to this invention may be constructed in other forms, different from those which have been just described, and particularly in various forms combining the particular features of this invention with features which are known in themselves.

Particularly, the glass according to the invention may be constructed as a safety glass comprising two glass panels glued together by means of a layer of flexible and transparent plastics, at least one of which is coated on its outside face by means of a filtering material layer according to this invention.

The glass according to the present invention may also be constructed in a form comprising a support a thick panel of glass, having for instance a thickness of 10 mm, in order to obtain a combination of a soundproofing effect and the radiant energy filtering effect.

In the accompanying drawings there is shown diagrammatically and by way of example three embodiments of the glass according to this invention and graphics illustrating the variation of the transmission of the electromagnetic radiation by said glass according to two of said embodiments, and also, for the purpose of comparison, by a glass of known type, as a function of the wavelength of said radiation.

Figure 1:
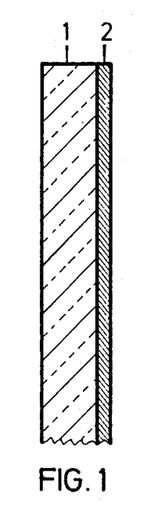
FIG. 1 is a sectional view of the glass, taken perpendicularly to its surface, according to a first embodiment.

The glass shown in FIG. 1 comprises a glass panel 1 and a filtering material layer 2. (The relative proportions between the thicknesses of panel 1 and layer 2 are not complied with in FIGS. 1, 3 and 4).

The glass panel 1 has a thickness of 3 mm and in the present case it is formed of a borosilicate glass having the following composition, expressed in percentage in weight: $SiO_2$ 80%, $B_2O_3$ 14%, $Na_2O$ 4% and $Al_2O_3$ 2%. The filtering material layer 2 is made of the compound TiN in Form of a layer having a thickness of 300 A.

According to a modification of the embodiment illustrated in FIG. 1, the glass panel 1 is made of a glass absorbing at least a part of the radiation having a wavelength between 0.7 and 2 micron.

In the present case, this absorbing glass is a borosilicate glass containing 3 percent in weight of ferric oxide FeO and having the following composition in percentage in weight: $SiO_2$ 80%, $B_2OO_3$ 14%, $Al_2O_3$ 3% and FeO 3%.

Figure 2:
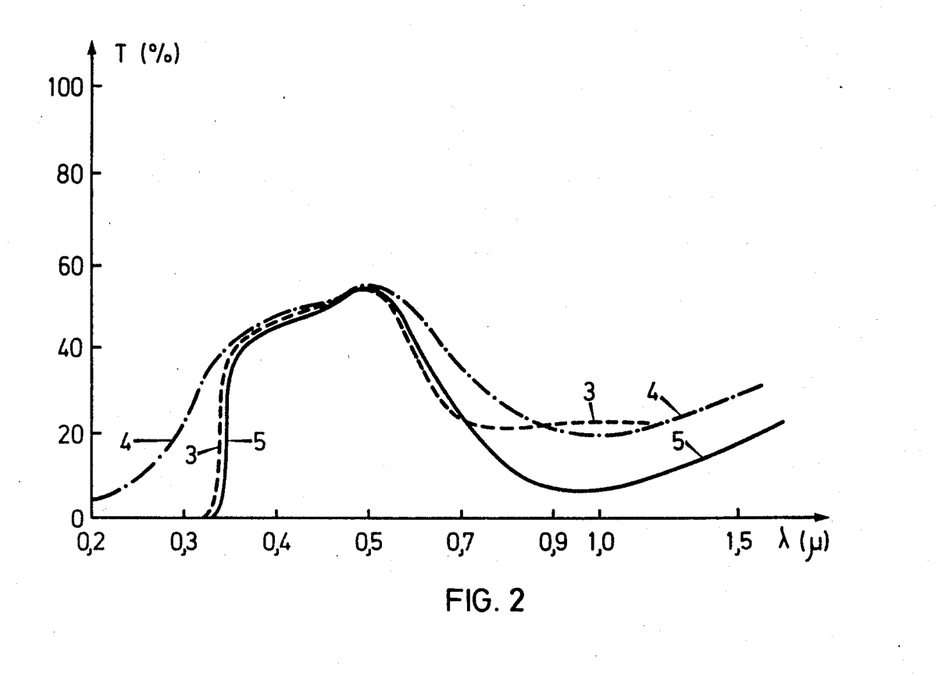
FIG. 2 shows three curves illustrating the variation of the transmission, effected by the glass according to FIG. 1 and by a known glass, of the electromagnetic radiation, as a function of the wavelength, in the domain of wavelengths comprising the visible part of the electromagnetic spectrum and the domain of the near infrared.

The representative curve of the variation of the transmission, as a function of the wavelength, of the glass corresponding to the embodiment shown in FIG. 1, is indicated in FIG. 2 by reference numeral 4.

The corresponding representative curve concerning the glass according to the modification of the embodiment shown in FIG. 1, is indicated by reference numeral 5 in FIG. 2.

For the purpose of comparison, the corresponding representative curve, in the case of a glass of a known type having the same structure as the glass shown in FIG. 1, also comprising a glass panel 3 mm thick having the above specified composition, coated by means of a gold layer of 200 A of thickness, is shown in FIG. 2 and is indicated by reference numeral 3.

As it can be seen from the representative curves shown in FIG. 2, the glass according to this invention has properties of filtering the visible light and the radiation belonging to the domain of the near infrared, which are similar to those of the known glass or even superior, as in the case of the glass corresponding to the modification of the embodiment shown in FIG. 1.

Figure 3:
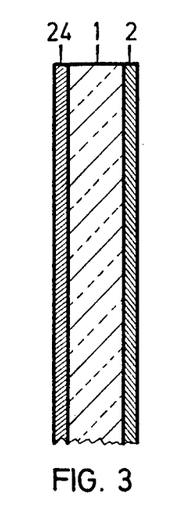
FIG. 3 is a sectional view of the glass, taken perpendicularly to its surface, according to a second embodiment.

The glass illustrated in FIG. 3, in addition to the panel 1 made of borosilicate glass and the filtering material layer 2, both of which are identical to those of the glass shown in FIG. 1, comprises a layer 24 of additional filtering material transmitting a part of the visible light and having a great absorption power for a radiation having a wavelength between 0.7 and 2 micron. In the present case, this additional filtering material is made of iron oxide FeO. The layer 24 covers the face of panel 1, which is opposed to that coated with the layer 2.

Figure 4:
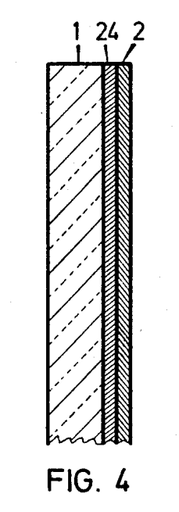
FIG. 4 is a sectional view of the glass, taken perpendicularly to its surface, according to a third embodiment.

The glass shown in FIG. 4 comprises the same elements as the glass shown in FIG. 3, but the layer 24 is interposed between the surface of panel 1 and the layer 2.

It should be noted that in all the embodiments which have just been described, the layer 2 is preferably placed on the glass face which is intended to be turned towards the interior of the room in order to obtain a highest heat insulating efficiency to avoid the heating of the room interior.

On the contrary, however, if it is desired to prevent the cooling of the interior of a room separated by means of the glass according to the invention from an outside ambient which has a temperature lower than that which is desired to be maintained in the closed room and is exempt from air stream, it is preferable to utilize the glass with the layer 2 turned towards the outside. Also a glass may be utilized which comprises a layer of filtering material on both faces.

The heat insulating properties of the glass according to this invention are decidedly superior to those of the simple glasses and comparable or even superior to those of the known double glasses.

In fact, the layer of filtering material coating the glass according to this invention possesses a great reflection power in respect of the radiation having a wavelength between 7 and 35 micron (domain of the far infrared, also called "thermic infrared" in which occurs preponderantly the thermic energy exchange by means of radiation), and a weak emissivity coefficient in the same spectral domain.

The effect produced by this glass is double: on one hand, the filtering material limits the energy exchange by radiation in the thermic infrared (heat insulating effect); on the other hand, it reduces the transmission through radiation of the heat accumulated by the glass towards the interior of the room to the advantage of the evacuation of this heat towards the outside (antisolar effect), this latter effect being obtained, as mentioned in the foregoing, by placing the layer of filtering material on the glass face which is turned towards the interior of the room.

It should be noted that the glass according to this invention, thanks to a suitable choice of the compound utilized to form the filtering material, may have a neutral hue of reflection and/or transmission, for instance grey or blue-gray.

The mechanical properties of the glass according to the invention are decidedly superior to those of the known glasses provided with a non protected metal layer. In fact, the compounds which are utilized to form the filtering material of the glass according to the invention are possessed of a very high hardness, for instance between 8 and 9 on the Mohs hardness scale in the case of titanium nitride TiN.

Furthermore, these compounds are possessed of a high electric conductivity, comparable to that of the metals, which permits to heat electrically the glass, if this is useful, by utilzing the filtering material layer as resistance, under a weak electric voltage. To this end, the glass may be provided with linear electrodes connected to a source of low voltage electric current.

To fabricate the glass according to the invention it is sufficient to deposit, by any suitable process, a layer of filtering material of suitable thickness on at least one of the faces of the glass panel.

To this end, well known processes may be used, as for instance the cathodic sputtering, reactive or non reactive, in direct current or in alternate current of high frequency, with or without polarization, or also the process of deposition by means of chemical reaction in gaseous phase, and so on.

EXAMPLE 1

By means of a device of reactive cathodic sputtering in direct current, identical to that described in the publication of J. R. GAVALER et al. (J. of Vacuum Science and Techn. 6 No. 1 page 177 – 1968) a layer of niobium nitride NbN, having a thickness in the order of 300 A, is deposited on a plate of hard glass (composition of the glass in percentage of weight: $SiO_2$ 80%, $B_2O_3$ 14%, $Al_2O_3$ 6%) having the shape of a disc of 2 cm diameter and 2 mm thickness.

To this end, an ultra-vacuum vessel is utilized which allows the obtaining of a vacuum of $5.10^{-9}$ torr and is provided with a liquid nitrogen trap and a seal joint made of copper.

As a target, a disc of pure niobium is utilized which encloses less than 100 ppm of gaseous impurities and has a diameter of 2 cm and a thickness of 0.2 mm. This target constitutes also the cathode of the sputtering device.

As an atmosphere, a mixture is utilized which is composed of nitrogen enclosing less than 50 ppm of impurities and having a partial pressure of $6.10^{-5}$ torr, and argon enclosing less than 50 ppm of impurities and having a partial pressure of $5.10^{-2}$ torr.

The glass plate which is intended to serve as a support for the deposition of the layer of niobium nitride is placed in face of the target, at a distance of 2 cm, parallel to the plane of the latter.

A removable mask made of stainless steel is interposed between the target and the plate of glass out of the period during which the deposition of the nitride layer on the plate of glass is effected.

As an anode, a strip of sheet tantalum is utilized which has a width of 2 cm and a thickness of 0.5 mm and is wound in the form of a ring of 6 cm diameter around the space situated between the target (cathode) and the glass plate (support).

The cathode sputtering is effected by applying a continuous voltage of 1700 volts between the cathode and the anode, whereby the glass plate is heated at about 500°C through radiation. A density of cathodic current of 21 mA/cm$^2$ is obtained.

The mask is interposed between the target and the glass plate after 2 minutes of sputtering. A glass is thus obtained which has a transmission in the order of 30 percent in the visible part of the spectrum and almost no transmission at all in the near infrared, in consequence of an almost total reflection of the radiation in this latter domain.

EXAMPLE 2.

The process is effected in the same manner as in Example 1, except that the niobium nitride layer is maintained, during the deposition of this layer, at a potential of - 200 volts in relation to the cathode. To this end, before initiating the cathodic sputtering, a layer of silver having a thickness of about 0.1 micron is deposited, by means of evaporation/condensation under vacuum, onto the glass plate, in the form of a conductor frame having a width of 1 mm.

Thus, a layer of niobium nitride is obtained which has a higher electric conductivity than that obtained according to Example 1 and a coefficient of emissivity in the thermic infrared (radiations having a wavelength between 7.5 and 3.5 micron) which is lower than that of this latter layer.

EXAMPLE 3.

A layer of titanium nitride TiN is deposited, by means of reactive cathodic sputtering in direct current, onto a plate of hard glass of same composition as that of Example 1, having the form of a disc of 1 cm diameter and 1 mm thickness.

To this end, the surface of the glass plate is previously cleaned by dipping it into a bath of hydrofluoric acid in aqueous solution of 10 percent by volume, and then it is rinsed first with acetone and then with ethyl alcohol, and finally it is dried.

Successively the plate is placed in a vacuum vessel of stainless steel, driable at a temperature of 100°C, provided with a diffusion pump connected to a liquid air trap, and including a device for cathodic sputtering in direct current provided with a cathode consisting of a disc of pure titanium having a diameter of 4 cm, which serves also as a target, and with a grounded anode of stainless steel which serves as support for the glass plate and is placed in face of the cathode beneath it and at a distance of 34 mm from it.

A movable shutter formed by a sheet steel plate is interposed between the glass plate and the cathode out of the period of deposition of the titanium nitride layer.

After having created a preliminary vacuum of $10^{-2}$ mm Hg in the vessel and rinsed the gas feeding lines which are provided thereon, a vacuum of $5.10^{-5}$ torr is created therein and a high purity argon (99.999 percent) is introduced till a pressure of 0.08 torr is obtained.

An ionic discharge in direct current is then initiated between the cathode and the anode, and this discharge is maintained during 1 minute.

Successively, nitrogen of high purity is introduced in the vessel by means of a regulation valve in such a manner as to establish and maintain a pressure of 0.1 torr, to replace the argon.

Then, an inspection is made to make sure that the plate of glass is at the ambient temperature and afterwards the shutter is displaced so as to put the plate of glass in view of the anode and the discharge voltage is brought up to 3.8 kilovolt. A discharge current of 12 mA is thus obtained, which corresponds to a cathodic current density of 1.3 mA/cm$^2$. During this discharge, the temperature of the silicon plate increases to 310°C. After 25 minutes of discharge, the shutter is placed again between the cathode and the glass plate, and after this the current is interrupted and the glass plate is submitted to a cooling during 15 minutes by maintaining the same nitrogen pressure as during the charge.

Thus, the deposition of a layer of titanium nitride is obtained which has a thickness in the order of 300 A and a resistance of 70 Ohm at 300°K and 75 Ohm at 78°K, as measured between two parallel contact wires of gold having a length of 1 cm resting on the surface of said layer at a distance of 1 cm from each other.

Figure 5:
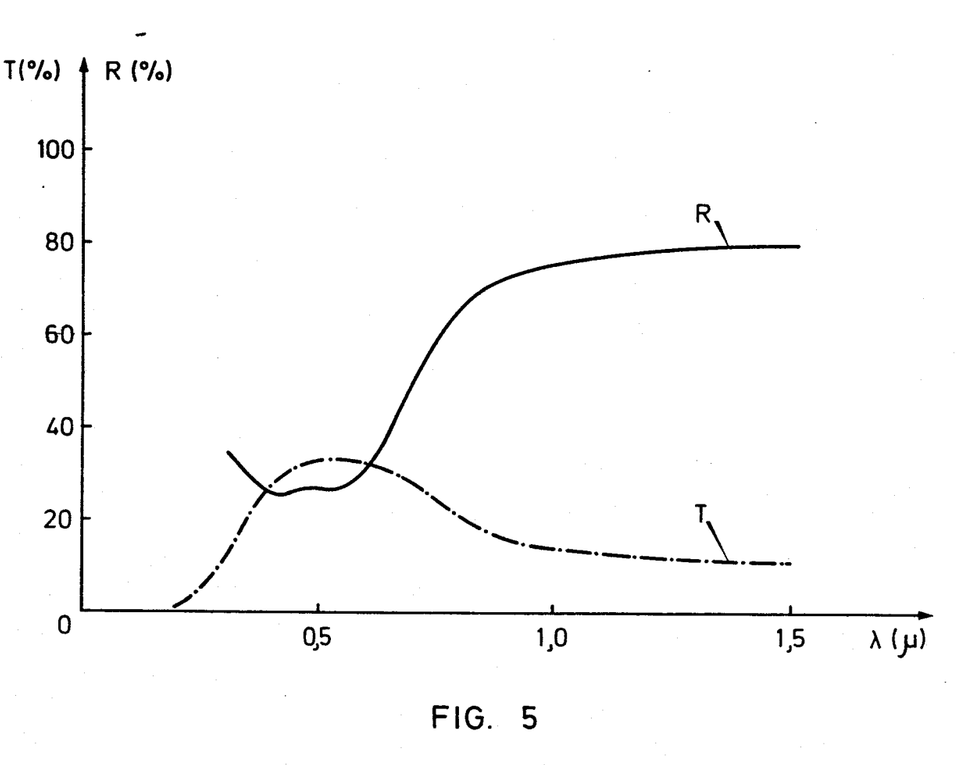
FIG. 5 shows the curve of spectral transmission T and the curve of spectral reflexion R of a glass according to the invention, the exact fabrication conditions of which are described hereunder by way of example.

The curve of spectral transmission T (at an angle of incidence of 90°) and the curve of spectral reflection R (at an angle of incidence of 45°) of the glass thus obtained are represented in FIG. 5.

EXAMPLE 4

(Deposition of a titanium nitride layer on a glass plate identical to that utilized in the foregoing examples)

The process is effected in the same way as in Example 3, except that instead of nitrogen a mixture of ammonia, under a partial pressure of 1 torr, and argon under a partial pressure of 50 torr is used.

EXAMPLE 5

By means of non reactive cathodic sputtering in direct current a layer of titanium nitride TiN is deposited on a plate of hard glass identical to that used in example 3.

To this end, the process is effected in the same way as described in Example 3, but utilizing as target a disc of 4 cm diameter formed by a sintered body of tungsten carbide WC, coated by means of a layer of titanium nitride TiN having a thickness of 6 mm. (Preferably, the deposition of this latter layer on the sintered body of tungsten carbide is effected, in a known manner, by means of a chemical reaction in gaseous phase, such process being called "CVD").

As atmosphere during the discharge, an argon of 99.999% under a pressure of 0.1 torr is utilized.

The intensity of the discharge current is of 7 mA. The glass plate which is utilized as support is heated by radiation, during the discharge, at a temperature of 200°C. The duration of the discharge is 90 minutes.

The deposition of a layer of titanium nitride TiN is thus obtained which has a thickness in the order of 300 A and a resistance, measured in the same manner as described in Example 4, of 68 Ohms at 26°C.

EXAMPLE 6

By utilizing a device for non reactive high frequency cathodic sputtering, identical to that described in the following publication: D. H. GRANTHAM et al., J. of Vacuum Science and Techn. 7 No. 2 (1969), a layer of titanium nitride TiN having a thickness in the order of 500 A is deposited on a plate of hard glass identical to that used according to Example 1 but having a diameter of 7 cm instead of 2 cm.

The sputtering is effected under a vacuum of $3.10^{-2}$ torr with pure argon as residual gas.

As a target, a disc of sintered titanium nitride is utilized, which has a diameter of 7 cm and a thickness of 0.5 cm and is obtained in the manner described in the following book: Gmelin, Ti-Band, pages 273 ff and 277 (nitriding of titanium plate by means of heating at 1200°C during 10 hours in a TiC tube in a nitrogen current, crushing of the obtained product and double repetition of the operation of nitriding, sintering of the powder thus obtained, in the presence of 2 percent by weight of metal titanium, at a temperature of 2300°C under a nitrogen atmosphere, final heating under vacuum of the obtained sintered TiN disc, in proximity of its melting point by means of a generator of high frequency current).

As a high frequency electride, a hollow disc of copper of 6,5 cm diameter is utilized, which disc is cooled interiorly by means of a stream of cold water. This disc is positioned horizontally and on this disc is placed the disc of titanum nitride. The high frequency electrode is provided with a screening made of stainless sheet steel which leaves a space of 0.6 cm width between itself and said electrode, this space being maintained under a vacuum of $10^{-5}$ torr and insulated in respect of the discharge space by means of sealing ring made of insulating ceramic and provided with copper joints.

The glass plate serving as deposition support is placed above the disc of titanium nitride, in face of the latter, at a distance of 2.5 cm from it and parallel to its plane.

This glass plate is maintained in contact over its entire surface opposed to that on which the layer of titanium nitride is deposited, with a copper plate which is cooled by means of pipes through which passes a flow of cold air. The delivery of cooling air is adjusted at a value which is sufficient to maintain the temperature of the glass plate at a value less than 300°C.

The sputtering is effected under a vacuum of $3.10^{-2}$ torr, the residual gas being formed by pure argon, with a frequency of 13 MHz and a density of discharge power of 50 watts/cm$^2$.

A layer is obtained, having the desired thickness, at the end of a sputtering of 10 seconds.

EXAMPLE 7

The same procedure is followed as in Example 6, except that behind the glass plate and in contact with its entire surface is placed a copper plate cooled by means of circulating air, this plate forming an electrode grounded by means of a passive L-C circuit at variable parameters having a resonance frequency equal to 13 MHz. The parameters of this circuit are regulated in such a way as to produce a continuous negative polarization of 100 volt before the support.

EXAMPLE 8

A layer of titanium nitride TiN is deposited by means of reactive evaporation on a plate of vitreous silicon in the shape of a disc having a diameter of 1 cm and a thickness of 1 mm.

To this end, the surface of the silicon plate is cleaned by dipping it into a bath of hydrofluoric acid in aqueous solution of 10 percent by volume, then it is rinsed first with acetone and then with ethyl alcohol, and successively it is dried.

After this, the plate is heated at 1200°C in a furnace placed in the vacuum vessel of stainless steel, driable at 100°C, in which a vacuum of $10^{-7}$ torr is established by means of a diffusion pump provided with a liquid air trap.

High purity nitrogen (99.999 percent $N_2$, 0.001 percent $O_2$) is introduced in the vessel by means of a previously degasificated valve so as to stabilize the pressure in said vessel at $1.4 \times 10^{-5}$ torr

A cone-shaped basket made of tungsten containing pure titanium, also situated in the vacuum vessel, is brought up, by heating it by means of Joule effect, to a temperature of 1,360°C, and by displacing a shutter constituted by a thin sheet steel plate one of the surfaces of the silicon plate is exposed, for 90 seconds, to the combined action of the titanium vapor and nitrogen atmosphere.

In this way, the deposition of a layer of titanium nitride is obtained, which has a thickness in the order of 300 A.

EXAMPLE 9

A layer of titanium nitride TiN is deposited on a plate of borosilicate hard glass having the following composition by weight: $SiO_2$ 80%, $B_2O_3$ 14%, $Na_2O$ 4% and $Al_2O_3$ 2% and having the shape of a disc of 10 mm diameter and 1 mm thickness.

This deposition is effected by chemical reaction in gaseous phase according to the following reaction:

$$TiCl + 2H_2 + \tfrac{1}{2} N_2 \longrightarrow x\, TiN + (1 - x)\, TiNCl + (3 + x)\, HCl + (1 - x/2)\, H_2 \text{ } x \text{ being less than } 1.$$

To this end, a reaction vessel is utilized in which a pressure of 3 torr is maintained during the reaction, and the glass plate is heated at 600°C by contact with a support of graphite, metal-clad by means of a silicon film, heated by a high frequency induction by means of a generator having a maximum power of 10 kWatts.

The delivery of gas, at the inlet of the vessel, is regulated to the following values (volumes measured under the normal conditions of temperature and pressure):

| | |
|---|---|
| $TiCl_4$ | 1.4 cm³/min. |
| $H_2$ | 100 cm³/min. |
| $N_2$ | 25 cm³/min. |

The deposition is stopped as a semitransparent layer is obtained having a reflection power of 20 percent in visible light (measured by comparison with a standard reflector).

Successively, the glass plate coated with the semitransparent layer is annealed by heating it as 600°C in an atmosphere of hydrogen under a pressure of 1 atmosphere, for 10 hours.

EXAMPLE 10

The same procedure is followed as in Example 9, but the deposition of the semitransparent layer is effected in four separate operations of annealing for 30 minutes under an atmosphere of hydrogen.

I claim:

1. Filtering antisolar and heat insulating glass, comprising a support including at least one panel of light-transmitting material capable of transmitting at least a part of the spectrum of visible light, and at least one coalescent layer of filtering material applied to and adhering on at least one face of the panel, said filtering material comprising at least one compound selected from the borides, carbides, nitrides, carbonitrides and suboxides of at least one of the following metals: titanium, zirconium, hafnium, vanadium, niobium, tantalum, chromium, molybdenum and tungsten, and wherein the electric resistance of a square-shaped part of said layer of filtering material, having a thickness of between 200 and 1000 A, has an electrical resistance at most equal to 200 Ohms at ambient temperatures and 400 Ohms at −195°C.

2. Glass according to claim 1, wherein said compound is a nitride selected from the group consisting of TiN, ZrN, HfN, VN, NbN, TaN, CrN and $Cr_3N_4$.

3. Glass according to claim 1, wherein said compound is a carbide selected from the group consisting of ZrC, HfC, TaC and WC.

4. Glass according to claim 1, wherein said compound is a boride selected from the group consisting of $Zr_3B_4$, $HfB$, $VB_2$, $NbB_2$, $TaB_2$ and $TiB_2$.

5. Glass according to claim 1, wherein said compound is a suboxide selected from the group consisting of TiO, VO and NbO.

6. Glass according to claim 1, wherein at least a part of said compound is in the crystal form.

7. Glass according to claim 1, wherein said panel is composed of mineral glass.

8. Glass according to claim 1, wherein said panel comprises a glass absorbing at least a part of radiation having a wavelength between 0.7 and 2 micron.

9. Glass according to claim 1, wherein the layer of filtering material comprises a dispersion of said compound in a coalescent layer comprising at least one semiconductor having a high conduction electron density.

10. Glass according to claim 9, wherein said semiconductor is selected from the oxides $SnO_2$, CdO, ZnO, SnO, $In_2O_3$ and $Ga_2O_3$ and the mixed oxides formed from at least two of said oxides.

11. Glass according to claim 1, further comprising means for heating by the Joule effect.

12. Glass according to claim 1, wherein said layer of filtering material comprises a continuous layer.

13. Filtering antisolar and heat insulating glass, comprising; a support including at least one panel of light-transmissive glass which is absorptive of at least a part of radiation having a wave length between 0.7 and 2 microns, said glass being a borosilicate glass containing at least one oxide selected from the group consisting of FeO, NiO and CoO; and at least one coalescent layer of filtering material applied to and adhering on at least one face of the panel said filtering material comprising at least one compound selected from the carbides, borides and carbonitrides of a metal selected from the group consisting of titanium, zirconium, hafnium, vanadium, niobium, tantalum, chromium, molybdenum and tungsten and wherein the electric resistance of a square-shaped part of said layer having a thickness of between 200 and 1000 A has an electrical resistance at most equal to 200 Ohms at ambient temperatures.

14. Filtering antisolar and heat insulating glass, comprising; a support including at least one panel of light-transmissive material transmissive of at least a part of the spectrum of visible light; at least one coalescent layer of filtering material applied to at least one face of the panel, said filtering material comprising at least one compound selected from the carbides, borides and carbonitrides of a metal selected from the group consisting of titanium, zirconium, hafnium, vanadium, niobium, tantalum, chromium, molybdenum and tungsten and wherein the electric resistance of a square-shaped part of said layer having a thickness of between 200 and 1000 A has an electrical resistance at most equal to 200 Ohms at ambient temperature; and a layer of additional filtering material absorptive of at least a part of radiation having a wave length between 0.7 and 2 micron.

15. Glass acccording to claim 14, wherein said additional filtering material comprises at least one oxide selected from the group consisting of FeO, NiO and CoO.

16. Glass according to claim 14, wherein said additional filtering material comprises a semiconductor having a high conduction electron density.

17. Glass according to claim 16, wherein said semiconductor is selected from the oxides $SnO_2$, CdO, ZnO, SnO, $In_2O_3$ and $Ga_2O_3$ and the mixed oxides formed from at least two of said oxides.

18. Glass according to claim 14, wherein the layer of additional filtering material covers the panel face not coated with the layer of filtering material having said electrical resistance of a square-shaped part at most equal to 200 Ohms at ambient temperature.

19. Glass according to claim 14, wherein the layer of additional filtering material is interposed between the face of the panel and the layer of filtering material having said electrical resistance of a square-shaped part at most equal to 200 Ohms at ambient temperature.

20. Filtering antisolar and heat insulating glass, comprising; a support including at least one panel of light-transmitting material transmissive of at least a part of the spectrum of visible light; and at least one coalescent layer of filtering material applied to and adhering on at least one face of the panel, said filtering material comprising at least one carbonitride selected from the group consisting of $TiN_{0.7}C_{0.3}$ and $NbN_{0.4}C_{0.6}$ and wherein the electrical resistance of a square-shaped part of said layer having a thickness of between 200 and 1000 A has an electrical resistance at most equal to 200 Ohms at ambient temperature.

21. Filtering antisolar and heat insulating glass, comprising; a support including at least one panel of light-transmitting material transmissive of at least a part of the spectrum of visible light; and at least one coalescent layer of filtering material applied to and adhering on at least one face of the panel, said filtering material comprising at least one compound selected from the carbides, borides, and carbonitrides of a metal selected from the group consisting of titanium, zirconium, hafnium, vanadium, niobium, tantalum, chromium, molybdenum and tungsten and wherein the electric resistance of a square-shaped part of said layer of filtering material, having a thickness of between 200 and 1000 A, has an electrical resistance at most equal to 200 Ohms at ambient temperatures and 400 Ohms at −195° C.

22. Glass according to claim 21 wherein said compound is a carbide selected from the group consisting of ZrC, HfC, TaC and WC.

23. Glass according to claim 21 wherein said compound is a boride selected from the group consisting of $Zr_3B_4$, HfB, $VB_2$, $NbB_2$, $TaB_2$ and $TiB_2$.

24. Glass according to claim 21 wherein at least a part of said compound is in a crystal form.

25. Glass according to claim 21 wherein said panel is composed of mineral glass.

26. Glass according to claim 21 wherein said panel comprises a glass absorptive of at least a part of radiation having a wave length between 0.7 and 2 microns.

27. Glass according to claim 26 wherein said absorptive glass is a borosilicate glass containing at least one oxide selected from the group consisting of FeO, NiO and CoO.

28. Glass according to claim 21 having a layer of additional filtering material applied to the panel and absorptive of at least a part of radiation having a wavelength between 0.7 and 2 microns.

29. Glass according to claim 28 wherein said additional filtering material comprises at least one oxide selected from the group consisting of FeO, NiO and CoO.

30. Glass according to claim 28 wherein said additional filtering material comprises a semiconductor having a high conduction electron density.

31. Glass according to claim 30 wherein said semiconductor is selected from the oxides $SnO_2$, CdO, ZnO, SnO, $In_2O_3$ and $Ga_2o_3$ and the mixed oxides formed from at least two of said oxides.

32. Glass according to claim 28 wherein the layer of additional filtering material covers a face of said panel not coated with said layer of filtering material comprising said compound said square-shaped part of which has said electric resistance at most equal 200 Ohms at ambient temperatures.

33. Glass according to claim 28 wherein the layer of additional filtering material is interposed between a face of said panel and said layer of filtering material comprising said compound said square-shaped part of which has said electric resistance of at most 200 Ohms at ambient temperatures.

34. Glass according to claim 21 wherein said layer of filtering material comprises a dispersion of said compound in a coalescent layer comprising at least one semiconductor having a high conduction electron density.

35. Glass according to claim 34 wherein said semiconductor is selected from the oxides $SnO_2$, CdO, ZnO, SnO, $In_2O_3$ and $Ga_2O_3$ and the mixed oxides formed from at least two of said oxides.

36. Glass according to claim 21 further comprising means for heating said panel by the Joule effect.

37. Glass according to claim 21 wherein said layer of filtering material comprises a continuous layer.

* * * * *